United States Patent [19]

Puig et al.

[11] 3,931,066

[45] Jan. 6, 1976

[54] HIGH RESILIENCE POLYURETHANE FOAM

[75] Inventors: John E. Puig, Wallingford; Bruce G. van Leuwen, Trumbull, both of Conn.

[73] Assignee: Olin Corporation, New Haven, Conn.

[22] Filed: Aug. 8, 1974

[21] Appl. No.: 495,611

[52] U.S. Cl. .................... 260/2.5 AS; 260/2.5 AH; 260/2.5 AM
[51] Int. Cl.² ........ C08G 18/14; C08G 18/32; C08G 18/48; C08K 5/54
[58] Field of Search .. 260/2.5 AM, 2.5 AS, 2.5 AG, 260/2.5 AH, 2.5 BG

[56] References Cited
UNITED STATES PATENTS

| | | | |
|---|---|---|---|
| 3,467,606 | 9/1969 | Rice | 260/2.5 AH |
| 3,630,973 | 12/1971 | Ardis | 260/2.5 AM |
| 3,738,953 | 6/1973 | Anorga | 260/2.5 AJ |
| 3,741,917 | 6/1973 | Morehouse | 260/2.5 AP |
| 3,741,921 | 6/1973 | Lapkin | 260/2.5 AS |
| 3,803,064 | 4/1974 | Fishbein | 260/2.5 AW |
| 3,847,844 | 11/1974 | Fuzesi | 260/2.5 AS |

*Primary Examiner*—Donald E. Czaja
*Assistant Examiner*—C. Warren Ivy
*Attorney, Agent, or Firm*—F. A. Iskander; T. P. O'Day

[57] ABSTRACT

Selected polyether polyols are used as stabilizers in the production of high resilience polyurethane foam.

16 Claims, No Drawings

HIGH RESILIENCE POLYURETHANE FOAM

This invention relates to the preparation of flexible polyurethane foam. More particularly, the invention relates to an improvement in the preparation of high resilience polyether polyurethane foam.

It is known to prepare a polyurethane foam by reacting a polyether polyol, or a mixture of such polyols, with an organic polyisocyanate in the presence of a foaming agent and a reaction catalyst. A variety of polyether polyols have been used for this purpose including, for example, the products of condensing alkylene oxide with a polyhydroxy initiator having from 2 to 8 hydroxyl groups or a mixture of such initiators. Depending on the hydroxyl number of the polyether polyol used, the resulting foam can range in property from very flexible to completely rigid.

It is also known, in the art of making flexible polyurethane foam, that the use of highly reactive foam-forming formulations, incorporating a highly reactive organic polyisocyanate and a high-molecular-weight polyol having a certain level of primary hydroxy groups, yields a foam with improved resilience and other desirable physical properties. Such a foam has come to be referred to in the art as a "high resilience" foam.

Due to the highly reactive nature of the reaction mixture from which these high resilience foams are prepared, such foams are characteristically unstable. Consequently, in the absence of a curing catalyst, these foams usually succumb to substantial shrinkage or collapse shortly after the foaming reaction is completed and before they have become fully cured.

Now it has been found, according to the invention, that high resilience polyurethane foams can be stabilized against shrinkage and collapse by incorporating in the foam-forming reaction mixture a certain proportion of a select polyether polyol which contains at least about 30 percent of primary hydroxy groups and has a hydroxyl number ranging from about 250 to about 800. Foams prepared from such a reaction mixture, while exhibiting all the desirable properties of high resilience foam, are not susceptible to shrinkage or collapse even in the absence of a curing catalyst. As such they are of utility in a variety of cushioning and upholstering applications, particularly in the production of molded automotive seats.

In the preparation of the polyurethane foams of the invention, either the so-called "one-shot method" or the "semi-prepolymer technique" may be employed, the one-shot method being generally preferred. The polyurethane foam is prepared from a reaction mixture comprised of any combination of polyether polyols, as described hereinbelow, organic isocyanate, foaming agents, and reaction catalysts.

In order to achieve high resilience properties in the resulting foam, a polyether polyol reactant is used which is characterized by (1) a molecular weight of at least about 4,000, (2) a polyhydroxy alcohol nucleus, (3) polyoxyalkylene chain segments attached to the nucleus, and (4) a ratio of primary to secondary hydroxy groups ranging from about 1.5:1 to about 6:1. This polyether polyol, hereinafter referred to as "the main polyol reactant," can be prepared by methods generally well known in the art wherein, for example, a polyhydroxy alcohol initiator is condensed, in the presence of an alkaline catalyst, first with an alkylene oxide having 3 or more carbon atoms and then with ethylene oxide.

The polyhydroxy alcohol initiator which is used to prepare the main polyol reactant can be any such compound having a functionability of 2–4, i.e., 2–4 hydroxy groups. Illustrative are ethylene glycol, propylene glycol, the butylene glycols such as 1,3-butylene glycol, the pentane diols such as 1,5-pentane diol, the hexane diols such as 1,6-hexane diol, glycerin, trimethylolpropane, triethylolpropane, pentaerythritol, mixtures thereof and the like. The most preferred initiators are the aliphatic triols such as glycerin and trimethylolpropane.

In preparing the main polyol reactant, a polyhydric alcohol initiator as described above is sequentially condensed, in the presence of an alkaline catalyst such as potassium hydroxide, first with an alkylene oxide having 3–8, and preferably 3–4, carbon atoms and then with ethylene oxide. Illustrative of the alkylene oxides which are first condensed with the alcohol initiator are propylene oxide, butylene oxide, pentylene oxide, mixtures thereof and the like, propylene oxide being most preferred. In carrying out the sequential condensation reactions, such amounts of ethylene oxide and higher alkylene oxide are employed as to provide a polyether having a molecular weight of at least about 4,000, and in which polyether the ratio of primary to secondary hydroxy groups is from about 1.5:1 to about 6:1. Preferably, this polyether polyol has a molecular weight of about 4,500–7,500 and a ratio of primary to secondary hydroxyl groups ranging from about 2:1 to about 5:1. The most preferred main polyol reactant is an oxypropylated, oxyethylated aliphatic triol having a molecular weight of about 5,600–6,600 and a ratio of primary to secondary hydroxy groups ranging from about 2:1 to about 4.5:1.

It will be appreciated by those skilled in the art that the hydroxyl number of the main polyol reactant depends on, and can be determined as a function of, its molecular weight and its functionability as specified above. Thus if a determination of the hydroxyl number is desired, this can be easily calculated using the conventional formula $$\text{Hydroxyl No.} = \frac{(56.1)(1000)(\text{Functionability})}{\text{Mol. Wt.}}$$

Using the above formula, for example, the minimum molecular weight of about 4000 which is specified above corresponds to a calculated maximum hydroxyl number of about 28 in the case of polyether diols, about 42 in the case of polyether triols, and about 56 in the case of polyether tetrols. The same calculation can be made, if desired, in order to determine the hydroxyl number ranges corresponding to the preferred molecular weight ranges indicated above.

Pursuant to the method of the invention, the polyurethane foam is prepared from a reaction mixture comprising a main polyol reactant, as described above, and a select second polyether polyol. This second polyol, the use of which is critical to achieving a stable high resilience foam according to the invention, is hereinafter referred to as the "supplemental polyols."

As distinguished from the main polyol reactant, the supplemental polyol has a substantially higher hydroxyl number, i.e., about 250–800. Another important feature of the supplemental polyol is that at least about 30 percent of the hydroxy groups therein are primary groups. Any polyether polyol which meets these two criteria and which has an average functionability of about 2–6 may be employed as the supplemental polyol. Illustrative are the alkylene oxide adducts of polyhydroxy compounds. These can be prepared, using the general prior art oxyalkylation techniques referred to above, by condensing a polyhydroxy compound having an average of 2–6 hydroxy groups, including a mixture of such compounds, with alkylene oxide or with a mixture of alkylene oxides using random or step-wise addition. These alkylene oxides preferably have 2–4 carbon atoms and are exemplified by ethylene oxide, propylene oxide, butylene oxide, the halogenated alkylene oxides, such as 4,4,4-trichlorobutylene oxide, and mixtures thereof.

Any suitable polyhydroxy compound, including mixtures of such compounds, having an average of about 2–6, and preferably 2.5–5, hydroxy groups may be condensed with alkylene oxide in preparing the supplemental polyol. This includes for example the polyhydroxy alcohol initiators exemplified hereinabove in connection with the preparation of the main polyol reactant. Further illustrative polyhydroxy compounds include mixtures of methyl glucoside, sucrose, or dextrose (hydrous or anhydrous) with water and/or with an aliphatic alcohol having 2–4 hydroxy groups. The preferred polyhydroxy compounds for use in preparing the supplemental polyol are those selected from the group consisting of a mixture of dextrose and water, a mixture of dextrose and an aliphatic diol or triol, and a mixture of dextrose, water and an aliphatic diol or triol. Illustrative aliphatic diols and triols are preferably used in preparing the supplemental polyol include those mentioned hereinabove in connection with the preparation of the main polyol reactant.

The condensation reaction used to prepare the supplemental polyol is carried out in the presence of an oxyalkylation catalyst. The acidic catalysts are preferred such as boron trifluoride or an etherate derivative thereof. This is in order to insure a product having the requisite minimum of primary hydroxyl groups, particularly where the alkylene oxide reactant is a propylene oxide, a butylene oxide or a mixture comprising one or more such oxides; for it is generally known that the oxypropylation or oxybutylation of a polyhydroxy compound in the presence of an acid catalyst yields a polyether product having at least 40 percent of primary hydroxy groups. However, where feasible, a basic oxyalkylation catalyst such as KOH may be employed provided that only ethylene oxide is used as the oxyalkylating agent or that the oxyalkylation reaction is carried out step-wise using more than one alkylene oxide with ethylene oxide being used in the final step. A sufficient proportion of alkylene oxide, or mixture thereof, is reacted with the polyhydroxy compound to achieve a hydroxyl number of about 250–800, and preferably about 300–700; whereupon, the oxyalkylation reaction is terminated and the polyether polyol product is recovered for use as taught herein. In accordance with the preferred embodiments of the invention a supplemental polyol, as described above, is employed in which about 40–100 percent of the hydroxy groups are primary.

Any suitable proportion of the supplemental polyol may be employed which is effective in stabilizing the foam without otherwise interfering with, or detrimentally altering, its properties. Thus a foam stabilizing proportion is usually used which may range from about 0.5 to about 12 parts per every 100 parts by weight of the main polyol reactant. However, it is preferred to employ about 1–10, and more preferably about 2–8, parts per 100 parts by weight of the main polyol reactant. The requisite proportion of the supplemental polyol may be preparatorily blended in with the main polyol reactant or it may be added separately to the foam-forming reaction mixture.

In preparing the foams of the invention, any suitable organic polyisocyanate, or a mixture of polyisocyanates, may be employed which is capable of readily reacting with a polyether polyol to form a polyurethane. Illustrative are toluene diisocyanate, such as the 80:20 and the 65:35 mixtures of the 2,4- and 2,6-isomers, ethylene diisocyanate, propylene diisocyanate, methylene-bis(4-phenyl isocyanate), 3,3′-bitoluene-4,4′-diisocyanate, hexamethylene diisocyanate, mixtures thereof and the like. It is preferred however to employ toluene diisocyanate or a mixture thereof with a polymethylene polyphenylisocyanate. Illustrative polymethylene polyphenylisocyanates are those described in U.S. Pat. No. 2,683,730.

The amount of polyisocyanate, including mixtures thereof, that is employed should generally be sufficient to provide at least 0.7 NCO group per hydroxy group in the reaction system, which includes the polyether polyols as well as any additional material and/or foaming agent present in the system. However, in practice such a proportion of polyisocyanate is usually employed as to provide no more than about 1.25, and preferably about 0.9–1.15 NCO, groups per each hydroxy group. A 100 multiple of the ratio of NCO to OH groups in the reaction system is referred to as the "index."

Any suitable foaming agent, or mixture of foaming agents, may be employed in preparing the polyurethane foam. These include inorganic foaming agents, such as water, and organic foaming agents containing up to seven carbon atoms, such as the halogenated hydrocarbons and the low molecular weight alkanes, alkenes, and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether and diisopropyl ether. Water and the low molecular weight polyhalogenated alkanes, such as monofluorotrichloromethane and dichlorodifluoromethane, are preferred. The amount of foaming agent may be varied within a reasonably wide range as is well known in the art. Generally, however, the halogenated alkanes, for example, are employed in an amount of about 2–20 parts per 100 parts by weight of the total polyether polyols; and water is employed in an amount of about 1–6 parts per 100 parts by weight of the total polyether polyols. In accordance with the most preferred embodiments of the invention, relatively low density foam is prepared by utilizing, as the foaming agent, water in a proportion of about 2.5–5.0 parts per every 100 parts of total polyether polyols.

The catalyst employed in preparing the foams of the invention may be any of the catalysts known to be useful for this purpose, including tertiary amines, mixtures thereof, organo-metallic salts, and mixture of an organo-metallic salt with one or more tertiary amine. The preferred catalysts are those which are comprised of at least one tertiary amine. Typical tertiary amines include for example triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark "Niax A-1," methyldicyclohexylamine, N-cyclohexylmorpholine, dimethylclohexylamine, methyldiethanolamine, mixtures of dimethylcyclohexylamine and 2(3-pentyl)-1-dimethylaminocyclohexane such as may be purchased commercially under the trademark "Polycat," bis(dimethylaminoethylpropylether), mixtures of triethylene diamine and dipropylene glycol such as the 1:2 and 1:4 weight ratio mixtures which may be purchased comercially under the trademarks "Dabco 33LV" and "Dabco 8020," respectively, and bis(dimethylaminopropylether). The preferred tertiary amine catalysts are triethylenediamine, mixtures of triethylenediamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is usually used in a proportion of about 0.1–1.5, and preferably about 0.25–0.75, parts per 100 parts by weight of the total polyol which is employed in preparing the foam.

Typical organo-metallic salts include for example the salts of tin, titanium, antimony, aluminum, cobalt, zinc, bismuth, lead, and cadmium, the tin salts, i.e., stannic and stannous salts, being preferred. Illustratively such salts include the octoates, dilaurates, diacetates, dioctoates, oleates, and neodeconates of these metals, the octoates being preferred. The organo-metallic salt catalyst is used in a proportion of about 0–0.5, and preferably about 0.05–0.2, parts per 100 parts by weight of total polyol which is employed in the preparation of the foam.

It is preferred in the preparation of the polyurethane foams of the invention to employ minor amounts of a conventional surfactant in order to further improve the cell structure of the polyurethane foam. Suitable such surfactants include for example, the silicon-based surfactants such as the silicones and the siloxaneoxyalkylene block copolymers, all of which are commercially available materials. Generally the silicones are employed in a proportion of up to about 0.1 parts per 100 parts by weight of the polyether polyol; and the siloxaneoxyalkylene block co-polymers are employed in a proportion of up to about 2 parts per 100 parts by weight of the polyether polyol.

If desired a curing agent, such as a conventional amine curing agent, may be included in the foam forming reaction mixture. However, in accordance with the invention, the use of curing agents is not necessary and therefore it is preferable to exclude such materials from the reaction mixture.

In the practice of this invention, a polyurethane foamforming reaction mixture comprising the above-described ingredients is fed to a suitable reaction zone such as by pouring into a suitable mold or onto a moving conveyor belt where reaction proceeds. The foaming reaction is exothermic, and auxiliary heat is usually not necessary to effect the reaction, although it may be employed. After the reactants have been thoroughly mixed together, an emulsion or "cream" forms. As the temperature increases from the reaction, gas bubbles are generated bringing about the formation of a cellular material which, when cured, will be ready for use in various cushioning applications.

Foams prepared according to the invention are substantially free of the drawbacks of prior art high resilience polyurethane foams which are prepared in the absence of a curing catalyst. Thus the foams of the invention are relatively stable and therefore do not succumb to substantial shrinkage or collapse before they become fully cured. Furthermore, these foams are characterized by a combination of desirable properties. Ranging in density from about 1.8 to about 3.8, and preferably from about 2.2 to about 3.0, pounds per cubic foot, they have a SAC factor generally in excess of 2.4 and usually at least 2.7. The "SAC factor" is a measure of support provided by a cushioning material. In accordance with the test described in ASTM D-1564-64T, it is expressed as the ratio of indentation load deflection, ILD, at 65 percent to 25 percent deflection. Thus by having a SAC factor of over 2.4, the foams of the invention, while being quite flexible and soft at the surface, exhibit little or no tendency to bottom out; and this property is achieved in the foams of the invention in the absence of fillers or other expedients which might alter the basic properties of the foam. The foams of the invention are also characterized by good tear strength, tensile strength and elongation properties.

By virtue of the combination of desirable physical properties characterizing the polyurethane foams of the invention, these foams meet the rigid requirement set by the automotive industry for making molded auto seats. They are also of utility in numerous other cushioning applications sch as in the manufacture of padding, seat cushions and the like.

The following examples are provided to illustrate the invention. In these examples, all parts and percentages are by weight unless otherwise specified.

EXAMPLE 1

A flexible polyurethane foam was prepared from the following ingredients in the indicated proportions:

| Ingredients | Parts by Weight |
| --- | --- |
| Main polyol (1) | 100 |
| Supplemental polyol (2) | 1.5 |
| Organic isocyanate (3) (105 index) | 39.7 |
| Triethylene diamine catalyst composition (4) | 0.35 |
| Bis(2-dimethylaminoethyl)ether catalyst composition (5) | 0.1 |
| Water | 3 |
| Polydimethyl siloxane surfactant (6) | 0.04 |

1. This is a 5,840 molecular weight polyether triol prepared by the KOH catalyzed oxyalkylation of glycerin first with about 87 moles of propylene oxide and then with 15 moles of ethylene oxide. It has a ratio, primary to secondary hydroxy groups, of 2.3:1.
2. This is a polyether polyol having approximately 50 percent primary hydroxy groups. It was prepared by condensing, in the presence of boron trifluoride etherate catalyst, a mixture of 3 moles of anhydrous dextrose and 1 mole of glycerin with propylene oxide to an average hydroxyl number of 435.
3. This is a mixture of 80 percent by weight toluene diisocyanate (consisting of 80 percent 2,4- and 20 percent 2,6-isomers) and 20 percent polymethylene polyphenylisocyanate having a functionability of about 2.6, which was purchased commercially under the trademark "PAPI-135."
4. This catalyst composition, purchased commercially under the trademark "Dabco 33LV," consists essentially of ⅓ triethylene diamine and ⅔ dipropylene glycol by weight.
5. This catalyst composition, purchased commercially under the trademark "NIAX A-1," consists essentially of 70 percent bis(2-dimethylaminoethyl)ether and 30 percent dipropylene glycol by weight.
6. This surfactant was purchased commercially under the trademark "DC-200-5", and is a polydimethylsiloxane fluid having a viscosity of about 5 centristokes at 25°.

The above ingredients were mixed together and dispensed from a foaming machine into a square cardboard box. The foaming reaction took place instantly and was completed in less than 3 minutes. A uniform foam product was thus obtained which cured at room temperature without exhibiting any shrinkage or collapse. After measuring the core density of the foam, its physical properties were determined, namely, indentation load deflection properties and SAC factor (as described above, per ASTM D-1564-64T), tensile strength, tear strength and elongation. The latter three properties were determined in accordance with the test described in ASTM 1564-64. The tensile strength, expressed in pounds per square inch, is a measure of the minimum tension per unit cross-sectional area, which must be exerted on a standard foam sample to cause it to snap or break. The tear strength is expressed in pounds per linear inch, and this indicated the force necessary to cause a one-inch tear in a standard foam sample. Finally the elongation, which is expressed as a percentage of original length of the sample, is a measure of the length that the sample can be stretched to before it breaks or snaps. The results of all these determinations are provided in Table 1 below.

EXAMPLES 2-4

The identical procedure of Example 1 was followed except that instead of 1.5 parts of the supplemental polyol, 2.5 parts were used in Example 2, 3.5 parts in Example 3, and 4.5 parts in Example 4. In each case, the resulting foam had a uniform appearance and no shrinkage or collapse was observed. The physical properties of the cured foams of each example are provided in Table 1.

Table 1

| FOAM PHYSICAL PROPERTIES | | | | |
| --- | --- | --- | --- | --- |
| | Ex. 1 | Ex. 2 | Ex. 3 | Ex. 4 |
| Density (lbs./cu. ft.) | 2.7 | 2.7 | 2.7 | 2.8 |
| Indentation Load Deflection Properties (lbs.) | | | | |
| at 25% deflection | 24 | 24 | 25 | 26 |
| at 65% deflection | 67 | 67 | 70 | 80 |
| SAC Factor | 2.8 | 2.8 | 2.8 | 3.1 |
| Tensile Strength (lbs./sq. in.) | 13.5 | 13.4 | 13.0 | 14.0 |
| Tear Strength (lbs./linear in.) | 1.9 | 1.8 | 2.0 | 2.1 |
| Elongation (%) | 190 | 170 | 170 | 170 |

EXAMPLE 5

Following the general procedure of Example 1, a flexible foam was prepared from the following ingredients in the indicated proportions:

| Ingredients | Parts by Weight |
| --- | --- |
| Main polyol (per Ex. 1) | 100 |
| Supplemental polyol [7] | 5.2 |
| Triethylene diamine catalyst (per Ex. 1) | 1.75 |
| Polydimethyl siloxane surfactant (per Ex. 1) | 0.04 |
| Toluene diisocyanate (80/20, 2,4-/2,6-isomer mixture) | 36.9 |
| Water | 3.0 |

7. This is a polyether polyol having approximately 50 percent primary hydroxy groups. It was prepared by condensing, in the presence of boron trifluoride etherate catalyst, a mixture of 2 moles anhydrous dextrose and 1 mole glycerin with propylene oxide to an average hydroxyl number of 375.

The foaming reaction proceeded as in Example 1 and a good, uniform foam product was obtained which exhibited no shrinkage or collapse.

COMPARISON 1

The identical procedure of Example 5 was followed except that no supplemental polyol was included in the reaction mixture. The resulting foam collapsed shortly after the foaming reaction was completed. Thus in light of the result of Example 5, this comparison demonstrates the fact that a high resilience polyurethane foam forming formulation must include a stabilizer, such as taught herein, to prevent the resulting foam from collapsing.

COMPARISON 2

The identical procedure of Example 5 was again followed with one exception. This is that instead of the supplemental polyol used in that example, an equal proportion of another polyol was employed. This polyol had less than 10% of primary hydroxy groups and was prepared by the KOH catalyzed oxypropylation of a mixture of 3 moles of glycerin and 1 mole of sucrose to a hydroxyl number of 375. Thus the supplemental polyol used in this comparison, while it had the same hydroxyl number as that of the supplemental polyol used in Example 5, differed from the latter in that it had a much lower proportion of primary OH groups. The foam of this example again exhibited total collapse shortly after the foaming reaction was completed. This demonstrates the need for a supplemental polyol having the requisite proportion of primary hydroxy groups, as taught herein, in making a stable high resilience polyurethane foam.

COMPARISON 3

Again the identical procedure of Example 5 was followed with one exception. Instead of the supplemental polyol used in that example, an equal proportion of another polyol was employed. The latter, although it did contain more than 30 percent of primary hydroxy groups, had a hydroxyl number of 56.1 which is well below the range specified according to the invention. This polyol was prepared by the KOH catalyzed oxyalkylation of glycerin first with propylene oxide to a hydroxyl number of 60.5 and then with 5 moles of ethylene oxide. The resulting foam again succumbed to collapse, and this demonstrates the importance of the hydroxyl number criterion in the supplemental polyol which is used according to the invention.

EXAMPLE 6

Following the general procedure of Example 1, a flexible polyurethane foam was prepared from the following formulation:

| Ingredients | Parts by Weight |
|---|---|
| Main polyol (per Ex. 1) | 98.2 |
| Supplemental polyol (8) | 1.8 |
| Toluene diisocyanate (80/20 mixture of 2,4-/2,6-isomers) | 35.6 (105 index) |
| Triethylene diamine catalyst (per Ex. 1) | 1.5 |
| Bis(2-dimethylaminoethyl)ether (per Ex. 1) | 0.01 |
| Water | 3.0 |
| Polydimethyl siloxane surfactant (per Ex. 1) | 0.04 |

8. This is polyether polyol having approximately 50% primary hydroxy groups. It was prepared by condensing, in the presence of boron trifluoride etherate catalyst, an equimolar mixture of ethylene glycol and α-D-glucose monohydrate with 4,4,4-trichlorobutylene oxide to an average hydroxyl number of 360.

A uniform, stable foam exhibiting no shrinkage or collapse was prepared from the above mixture. The tensile strength, tear strength and elongation of this foam, after it was cured, were determined, as described in Example 1, and the results are provided in Table 2 below.

EXAMPLES 7-8

The identical procedure of Example 6 was followed except that instead of the 1.8 parts of supplemental polyol used in that example, 3.0 parts were used in Example 7 and 5.4 in Example 8. Also, in order to maintain an isocyanate index of 105, the proportion of toluene diisocyanate was increased to 36.3 parts in the case of Example 7 and to 37.6 parts in the case of Example 8. The foams prepared according to these two examples were again uniform and stable, and they exhibited no shrinkage or collapse. The tensile strength, tear strength and elongation properties of the foams are provided in Table 2.

Table 2

| FOAM PHYSICAL PROPERTIES | | | |
|---|---|---|---|
|  | Ex. 6 | Ex. 7 | Ex. 8 |
| Tensile Strength (lbs./sq. in.) | 14.3 | 13.0 | 13.3 |
| Tear Strength (lbs./linear in.) | 2.2 | 2.1 | 2.4 |
| Elongation (%) | 310.0 | 263.3 | 260.0 |

What is claimed is:

1. In a process for preparing a flexible high resilience polyurethane foam from a reaction mixture comprised of an organic polyisocyanate, a foaming agent, a reaction catalyst polydimethylsiloxane fluid surfactant, and a polyether polyol reactant characterized by (1) a molecular weight of at least 4000, (2) a polyhydroxy alcohol nucleus having a functionability of 2-4, (3) polyoxyalkylene chain segments attached to said nucleus and (4) a ratio of primary to secondary hydroxy groups ranging from about 1.5:1 to about 6:1, the improvement which comprises including in said reaction mixture a foam stabilizing proportion of a supplemental polyether polyol having at least about 30% of primary hydroxy groups, an average of 2-6 hydroxy groups, and a hydroxyl number from about 250 to about 800, said supplemental polyol being an adduct of alkylene oxide having 2-4 carbon atoms and a mixture selected from the group consisting of a mixture of dextrose and water, a mixture of dextrose and an aliphatic diol or triol, and a mixture of dextrose, water and an aliphatic diol or triol.

2. A polyurethane foam prepared by the process of claim 1.

3. The process of claim 1 wherein said polyether polyol reactant is a polyether triol having a molecular weight of about 4500-7500.

4. The process of claim 3 wherein said supplemental polyol has a hydroxyl number of about 300-700 and an average of about 2.5-5 hydroxy groups.

5. The process of claim 4 wherein said polyether triol has a ratio of primary to secondary hydroxy groups ranging from about 2:1 to about 5:1.

6. The process of claim 5 wherein said stabilizing proportion ranges from about 0.5 to about 12 parts per every 100 parts by weight of said polyether triol.

7. The process of claim 6 wherein said supplemental polyol contains about 40-100 percent of primary hydroxy groups.

8. A polyurethane foam prepared by the process of claim 7.

9. The process of claim 7 wherein said polyether triol has a molecular weight of about 5600-6600 and said catalyst is comprised of at least one tertiary amine catalyst.

10. The process of claim 9 wherein said surfactant is a polydimethylsiloxane having a viscosity of about 5 centistokes at 25°C.

11. The process of claim 10 wherein said organic polyisocyanate is toluene diisocyanate or a mixture thereof with polymethylene polyphenylisocyanate.

12. The process of claim 11 wherein said supplemental polyol is an adduct of propylene oxide or 4,4,4-trichlorobutylene oxide and a mixture of dextrose with an aliphatic diol or triol.

13. A polyurethane foam prepared by the process of claim 12.

14. The process of claim 12 wherein said foaming agent is water.

15. The process of claim 14 wherein said polyether triol is an oxypropylated oxyethylated glycerin.

16. A polyurethane foam prepared by the process of claim 15.

* * * * *